United States Patent [19]
Ackley

[11] Patent Number: 6,003,775
[45] Date of Patent: Dec. 21, 1999

[54] GENERIC HANDHELD SYMBOLOGY SCANNER WITH A MODULAR OPTICAL SENSOR

[75] Inventor: H. Sprague Ackley, Seattle, Wash.

[73] Assignee: Intermec IP Corp., Woodland Hills, Calif.

[21] Appl. No.: 08/872,949

[22] Filed: Jun. 11, 1997

[51] Int. Cl.⁶ .................................................. G06K 7/10
[52] U.S. Cl. ................... 235/472.01; 235/462.47
[58] Field of Search ................................ 235/462, 472, 235/463, 467, 469, 470, 462.01, 462.02, 472.02, 472.01, 462.47, 462.16

[56] References Cited

U.S. PATENT DOCUMENTS

| | | |
|---|---|---|
| 3,169,186 | 2/1965 | Howard . |
| 3,671,720 | 6/1972 | White et al. . |
| 3,780,265 | 12/1973 | Lind . |
| 3,919,528 | 11/1975 | Cooper et al. . |
| 3,936,662 | 2/1976 | Rausing . |
| 3,990,044 | 11/1976 | Fahey et al. . |
| 4,029,945 | 6/1977 | Yamada et al. . |
| 4,621,189 | 11/1986 | Kumar et al. ............................ 235/472 |
| 5,155,659 | 10/1992 | Kunert ..................................... 361/380 |
| 5,288,984 | 2/1994 | Ito et al. ................................. 235/472 |
| 5,331,580 | 7/1994 | Miller et al. .......................... 364/708.1 |
| 5,349,497 | 9/1994 | Hanson .................................... 361/683 |
| 5,414,250 | 5/1995 | Swartz et al. . |
| 5,477,042 | 12/1995 | Wang . |
| 5,479,001 | 12/1995 | Kumar ..................................... 235/472 |
| 5,536,924 | 7/1996 | Ackley . |
| 5,850,078 | 12/1998 | Giordano et al. ....................... 235/462 |

FOREIGN PATENT DOCUMENTS

| | | |
|---|---|---|
| 2 683 062 | 4/1993 | France . |
| 2-212993 | 8/1990 | Japan . |

*Primary Examiner*—Thien Minh Le
*Attorney, Agent, or Firm*—Graham & James LLP

[57] ABSTRACT

A scanning apparatus comprises a scanner body portion having an internal receptacle within a scan head portion thereof. A scanning control unit is disposed within the body portion separate from the receptacle and has an electrical connection that extends through the body portion to the receptacle. A removable optical module is adapted to engage the receptacle and be connected electrically to the scanning control unit through the electrical connection. The module includes an optical sensor adapted to receive light reflected from the bar code symbology through an opening through the body portion and convert the light into data representative of the symbology. The data is thereby provided to the scanning control unit. The optical sensor may comprise either a one-dimensional charge-coupled device, a two-dimensional charge-coupled device, an articulated laser, or a light emitting diode.

18 Claims, 3 Drawing Sheets

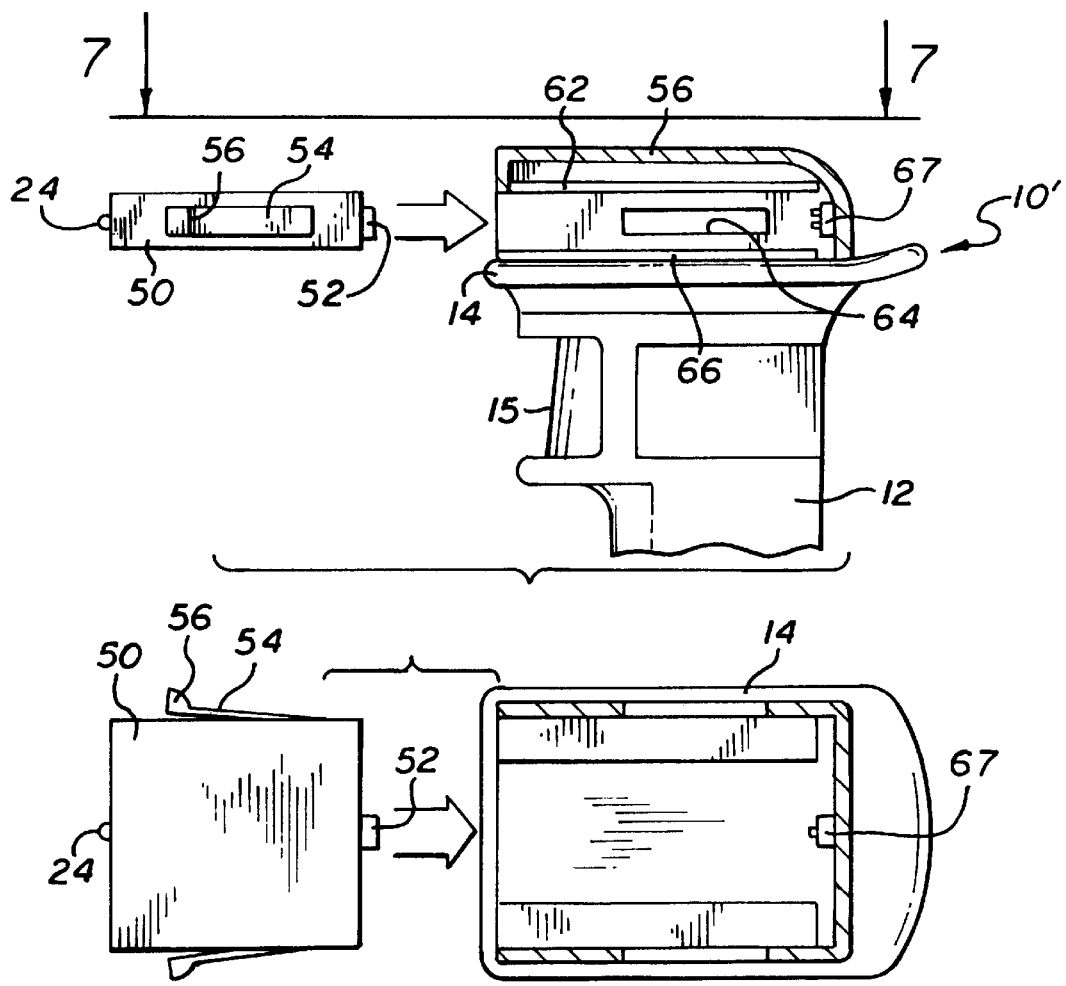
FIG. 6
FIG. 7
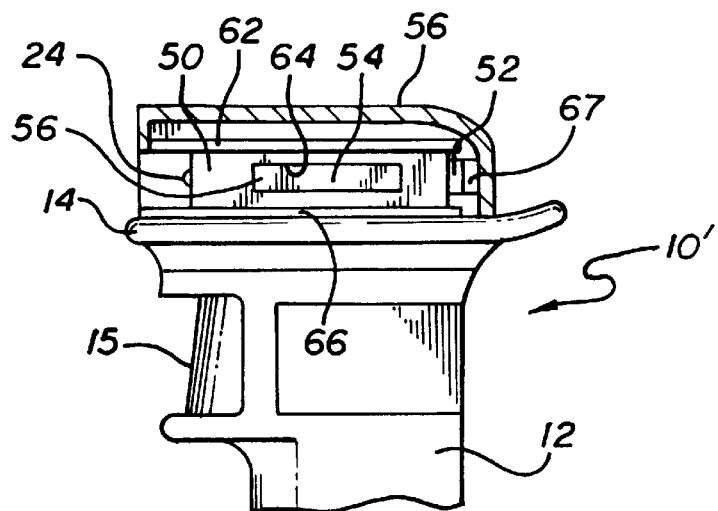
FIG. 8

GENERIC HANDHELD SYMBOLOGY SCANNER WITH A MODULAR OPTICAL SENSOR

RELATED APPLICATION

The present invention relates to application Ser. No. 08/546,778, filed Oct. 23, 1995 now abandoned, for FIXED MOUNT IMAGER USING OPTICAL MODULE.

BACKGROUND OF THE INVENTION

1. Field of the Invention

The present invention relates to electro-optical systems for reading a one or two-dimensional bar code symbology, and more particularly, to a generic handheld symbology scanner that can be adapted for various uses by selection of a removable modular optical unit.

2. Description of Related Art

Within the automatic data identification and collection industry, electro-optical systems are commonly used to decipher data symbols printed on objects in order to identify information regarding the objects. A conventional bar code symbol represents a one-dimensional form of symbology, and comprises a pattern of vertical bars of various widths separated by spaces of various widths. Since the bar and space elements have different light reflecting characteristics, a reader can convert the symbology into an electrical signal by analyzing the light reflected from the symbol. The electrical signal can then be decoded to provide an alphanumeric representation of the symbol which identifies the object. Bar code symbols of this nature are now in common usage in various types of applications, such as inventory management and control, point of purchase identification, logistical tracking systems, or time and attendance record keeping.

A bar code scanner typically uses a light source that is drawn, or scanned, across the bar code field. Since the bar code symbol is often disposed on the object to be identified, it is desirable for the scanner to be included in a handheld or portable device so that the scanner can be brought to the object. Light emitting diodes (LEDs) are often utilized to provide the light source due to their light weight and low power requirements. The operator can physically move the LED across the bar code field, such as by use of a light pen. Though advantageous for some applications, these LED scanners have a rather limited scanning range. Greater scanning range can be achieved by a bar code scanner that includes movable mirrors to automatically articulate a light beam from a laser emitting source back and forth at a high rate to scan the light beam across the bar code field. Another scanning approach is to utilize a one-dimensional charge-coupled device (CCD) having a single one-dimensional row of imaging elements. The CCD device converts the printed information of the bar code symbol into an electrical signal representation. A one-dimensional CCD scanner can read an entire bar code symbol at once without requiring movement of the light source, as is necessary with the LED or laser emitting systems described above. As with the articulated laser scanners, however, one-dimensional CCD scanners are orientation dependent and must be aligned with the bar code symbol to accurately collect the information.

Since the conventional one-dimensional symbology requires a relatively large amount of space to convey a correspondingly small amount of data, so-called two-dimensional symbologies have been developed. A two-dimensional symbology may comprise a matrix that occupies a uniform amount of space having a generally rectangular or square shape. Instead of bars and spaces, round or square dots disposed at particular rows and columns of the matrix correspond to the characters being conveyed. As a result, a matrix symbology can compress significantly more data into a given volume of space than a conventional one-dimensional bar code. Examples of commercially available two-dimensional symbologies include Code One, Data Matrix, and PDF417.

Though some two-dimensional symbologies may be read using the conventional scanners described above, another approach is to convert the two-dimensional symbol into pixel information that is deciphered into the alphanumeric information represented by the symbology data. Such two-dimensional scanners may utilize two-dimensional CCD devices to obtain an optical image of the symbol and convert it into an electrical signal. These two-dimensional CCD scanners are not orientation dependent like the one-dimensional CCD or laser scanners, since the electrical signal may be processed to determine the rotational orientation of the symbol, remove any extraneous information, and thereby recover the alphanumeric information of the symbol. Thus, these two-dimensional scanners provide greater flexibility to the operator by permitting a symbol to be effectively read from a wide assortment of angles and orientations. An additional advantage of these two-dimensional scanners is that they can also be utilized to read one-dimensional symbology data, such as a conventional bar code symbol.

A drawback of each of the types of one and two-dimensional scanners described above is that they are not interchangeable and thus cannot be converted from one type to another. Each scanner type is optimized to use only one of the aforementioned optical sensors (e.g., LED, laser, CCD, etc.), which is mechanically and electrically integrated into the scanner in a permanent and non-removable manner. Since each scanner type has certain symbol reading applications for which it is most proficient and best suited, a user would select a scanner that is optimized for each particular application. Even if a user only utilizes scanners of the two-dimensional CCD type, there are differences in optical characteristics between individual scanners. For example, one type of CCD scanner may include focusing systems (i.e., lenses) optimized for scanning distances of less than one foot, while another type of CCD scanner may be optimized for distances of three to five feet. While a user can be ready for any scanning application by maintaining a supply of various types of scanners, it can be appreciated that this greatly increases the cost and complexity of operating an automatic data identification and collection system.

Accordingly, a critical need exists for an interchangeable scanner that can be optimized for various different applications. Moreover, such an interchangeable scanner should be able to operate with any type of optical sensor, and have a wide assortment of focusing characteristics.

SUMMARY OF THE INVENTION

An apparatus for scanning a one or two-dimensional bar code symbol is provided with an interchangeable optical sensor that can optimize the scanning apparatus for various different applications.

In a first embodiment of the invention, the scanning apparatus comprises a scanner body portion having a cover that may be opened to expose a receptacle. A scanning control unit is disposed within the body portion separate from the receptacle and has an electrical connection that extends through the body portion to the receptacle. A removable optical module is adapted to engage the receptacle and connect electrically to the scanning control unit through the electrical connection. The module includes an optical sensor adapted to receive light reflected from the bar code symbol through an opening of the body portion and convert the light into data representative of the symbology. The data is thereby provided to the scanning control unit. The optical sensor may comprise either a one or two-dimensional charge-coupled device, or an articulated laser.

In a second embodiment of the invention, the cover for the scanner body comprises an internal slot that extends from the opening provided in the cover. The optical module is adapted to slidable engage the slot, and a locking mechanism secures the optical module within the slot upon reaching a maximum extent thereof. An electrical connector provided in the receptacle is adapted to engage a corresponding electrical connector of the optical module upon operation of the locking mechanism. The optical module may thereafter be selectively removed from the slot by disengagement of the locking mechanism.

A more complete understanding of the generic handheld symbology scanner with a modular optical sensor will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 6 is a partial side sectional view of an alternative embodiment of the handheld scanner illustrating a modular optical sensor extracted outwardly of the scanner;

FIG. 7 is a top sectional view of the alternative embodiment of the handheld scanner taken through the section 7—7 of FIG. 6; and FIG. 8 is a partial side sectional view of the alternative embodiment of the handheld scanner with the modular optical sensor inserted into the scanner.

DETAILED DESCRIPTION OF THE PREFERRED EMBODIMENT

The present invention satisfies the critical need for an interchangeable scanner that can be optimized for various different applications. In the detailed description that follows, like element numerals are used to describe like elements illustrated in one or more of the figures.

Figure 1:
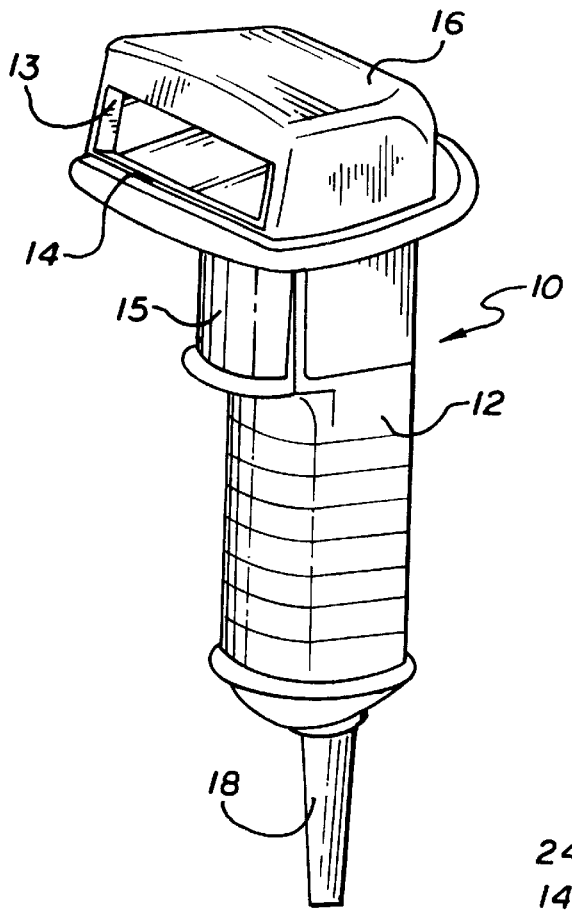
FIG. 1 is a perspective view of a handheld symbology scanner.

Referring first to FIG. 1, a handheld scanner 10 is illustrated. The scanner 10 comprises a hand-held device having a handle 12 with a trigger 15, and a scan head 14. The handle 12 has a shape that is intended to conform to an operator's hand, with the trigger 15 positioned in relation to the operator's index finger. The scan head 14 includes a cover 16 having an opening 13 provided therein to permit light reflected from the object to be projected therethrough onto the operative elements inside the scan head which will be described below. The cover 16 may be opened or detached from the scan head 14, as will also be described below. The scanner 10 may further have a keypad (not shown) to enable the entry of operator defined data pertaining to a particular scanning operation.

As known in the art, the scanner 10 can be oriented selectively by an operator to position a bar code symbol to be scanned within a field of view of the scanning apparatus. The bar code symbol may be disposed on a document or other such object, and may comprise a one or two-dimensional bar code symbol. To operate the scanner 10, the operator orients the scanner so that the opening 13 is directed generally toward the bar code symbol within the limited field of view of the scanner. The operator pulls back on the trigger 15, which causes the bar code symbol to become momentarily illuminated by a light source disposed within the scan head 14. Light reflected off of the bar code symbol passes back through the opening 13 onto an imaging element within the scan head 14. The imaging element then converts the reflected light into data which represents the bar code symbol.

The scanner 10 is adapted to communicate with a central processor (not shown) over a radio frequency (RF) or hard-wired communication link. To enable RF communication, the scanner 10 may include an antenna 18 for communicating RF signals. Alternatively, a cable (not shown) may be provided in place of the antenna 26 to enable hard-wired communication. The central processor may include a computer or a network of computers configured to communicate with one or more of such scanners 10 that are operating within a common environment, such as a factory, warehouse, or retail establishment.

Figure 2:
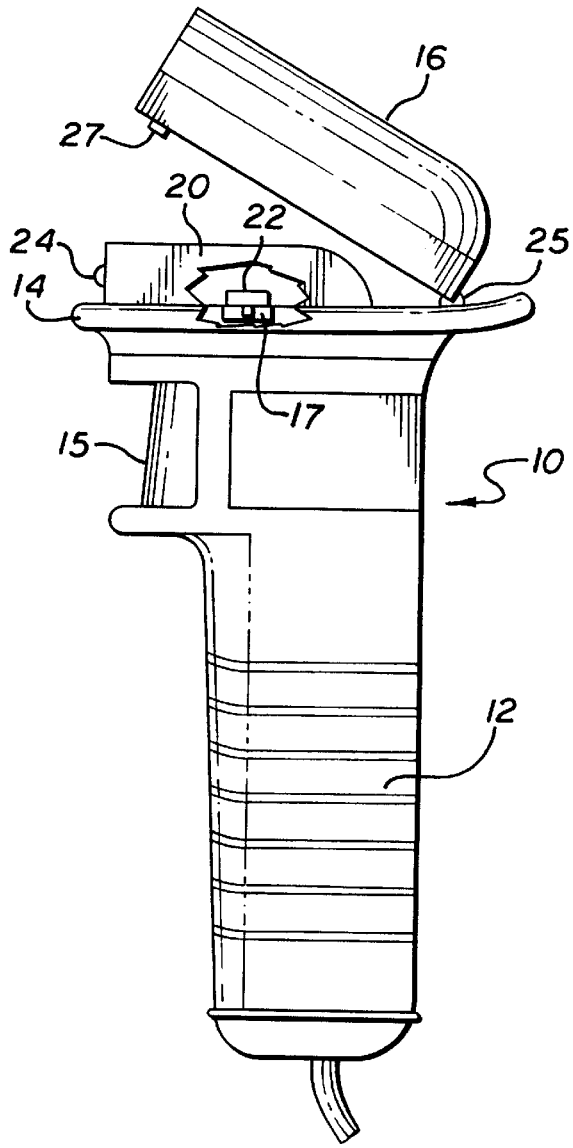
FIG. 2 is a side view of the scanner of FIG. 1, with the cover opened to expose a modular optical sensor of the present invention.
Figure 3:
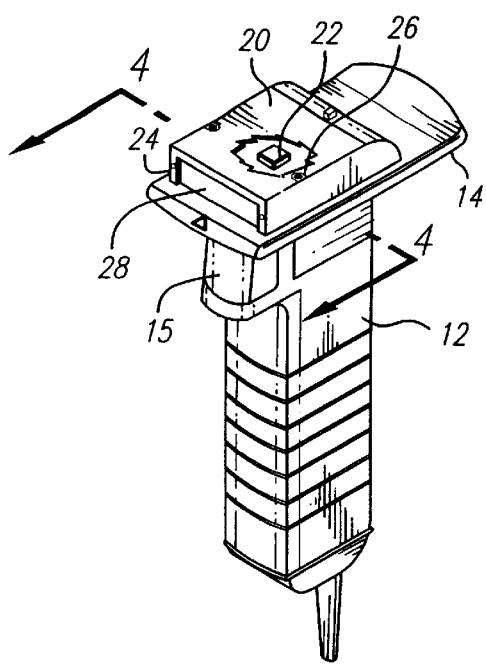
FIG. 3 is a perspective view of the scanner with the cover omitted showing a top portion of the modular optical sensor.
Figure 4:
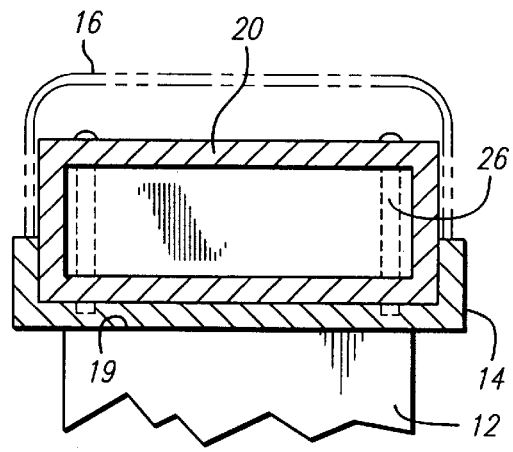
FIG. 4 is a sectional view of the modular optical sensor coupled to the scanner.

Referring now to FIGS. 2–4, the scanner 10 is shown with the cover 16 pivoted upward to an open position. The cover 16 may be attached to the scan head 14 by a hinge 25 disposed at a back end of the scan head, and may further include flexible hook members 27 that are adapted to couple with corresponding openings in the scan head 14 to form a snap-fit engagement. Alternatively, the cover may simply be attached to the scan head 14 using screws or the like, and may be entirely removable from the scan head.

With the cover 16 opened, an optical sensor module 20 of the present invention is visible. The sensor module 20 comprises a generally rectangular housing that fits snugly within a corresponding receptacle 19. As shown in FIGS. 3 and 4, a pair of screws 26 extend through a bore provided in a portion of the housing to secure the sensor module 20 to the scan head 14. Alternatively, the sensor module 20 may form a snap fit engagement with the receptacle 19 to avoid the need for screws. An electrical connector 17 coupled to the scan head 14 is adapted to engage a corresponding connector 22 of the sensor module 20 to provide an electrical connection between the sensor module 20 and the other elements of the scanner 10, as will be further described below. Respective ones of the connectors 17, 22 may be provided with male and female elements as is well known in the art. The sensor module 20 further includes a window 28 which allows light to enter and exit the sensor module through the opening 13 provided in the cover 16. In addition, flash elements 24 are mounted to the front surface of the sensor module 20 adjacent to the window 28. It is anticipated that the sensor module 20 be an entirely sealed unit that communicates with the scanner 10 only through the connectors 17, 22.

Figure 5:
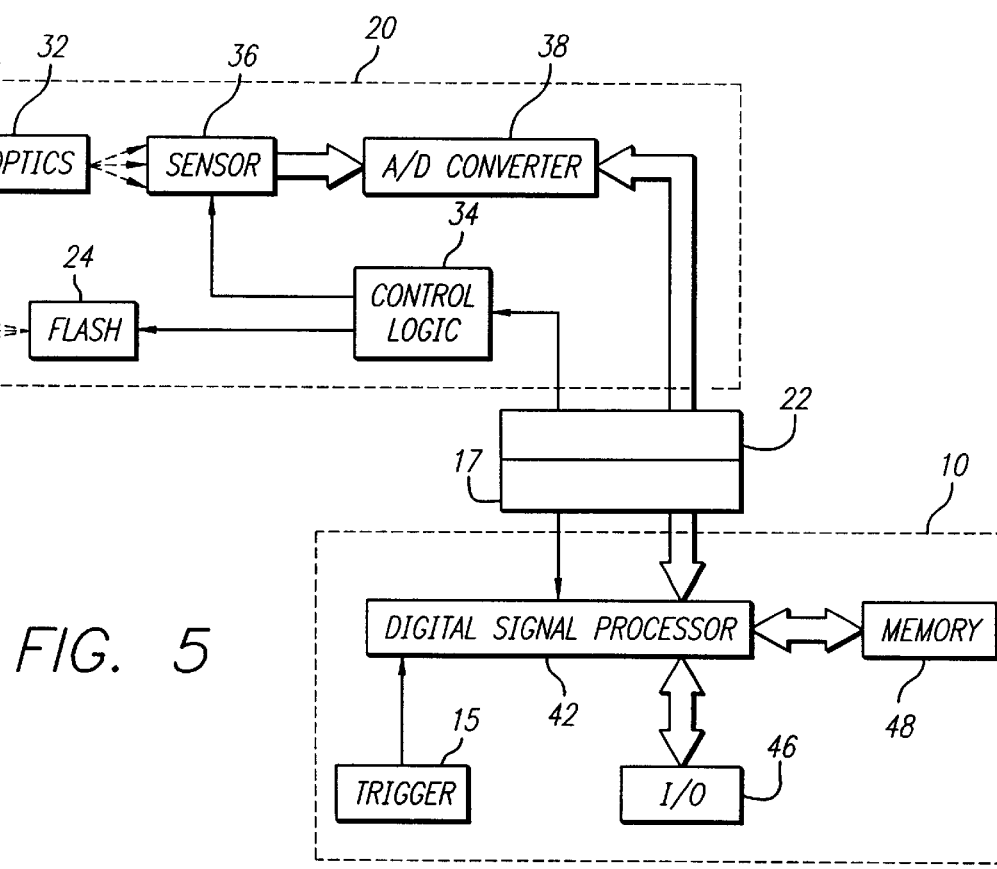
FIG. 5 is a block diagram illustrating the functional elements of the modular optical sensor and the scanner.

A block diagram of the functional elements of the bar code scanner 10 and sensor module 20 is shown in FIG. 5. The functional elements of the scanner 10 are disposed in a space provided with the handle 12. The bar code scanner 10 includes a digital signal processor 42, a memory 48, and an input/output (I/O) device 46. The digital signal processor 42 controls the sensor module 20 and is coupled to the memory 48 and the I/O device 46. The digital signal processor 42 may further include an internal memory space or read only memory (ROM) that contains a set of instructions or program to be executed by the digital signal processor. The memory 48 may comprise a conventional semiconductor random access memory (RAM) device. The I/O device 46 controls communications between the scanner 10 and the central processor. Particularly, the I/O device 46 is coupled to the hard-wired communication link described above, or may include an RF modulator that permits digital signals from the scanner 10 to be communicated to the central processor over the RF communication link described above. It should be apparent that the I/O device 46 may be configured to communicate digital signals by use of other known forms of wireless media, such as infrared communication. The scanner 10 may additionally include a power source to enable remote operation, such as a battery.

The sensor module 20 includes a sensor 36 that converts an optical image into electrical signals, such as a charge coupled device (CCD). A CCD comprises a one or two-dimensional array of photodiodes that respectively emit an electrical signal that varies with the intensity of light projected onto the surface of the CCD. The sensor module 20 may further include imaging optics 32 having fixed or variable focusing to control the focal length within the limited field of view of the sensor module 20. The flash element 24 provides illumination onto the bar code symbol of interest, and may be provided by a xenon tube. The intensity and time duration of the light provided by the flash element 24 may be variable. A control logic unit 34 provides control signals to each of the scanning sensor 36 and the flash element 24, and receives an input signal from the digital signal processor 42 to activate a scanning sequence.

The scanning sensor 36 provides an output signal that is converted from analog to digital by an analog-to-digital (A/D) converter 38 and then transferred to the digital signal processor 42. Particularly, the electrical signal generated by each photodiode of the scanning sensor 36 is converted into a binary number that represents a gray scale value of a corresponding area of the illuminated object. The digital signal processor 42 directs the control logic unit 34 and processes the data from the A/D converter into information representative of the bar code symbol, which is then stored in the memory 48. Each of these signals between the sensor module 20 and the digital signal processor 42 pass through the connectors 17, 22. Electrical power may also be provided to the sensor module 20 through the connectors 17, 22.

Referring now to FIGS. 6–8, an alternative embodiment of the scanner 10' is illustrated. As in the previous embodiment, the scanner 10' comprises a hand-held device having a handle 12 with a trigger 15, and a scan head 14. The scan head 14 includes a cover 56 having an opening 13 provided therein to permit light reflected from the object to be projected therethrough onto the operative elements inside the scan head which will be described below. Unlike the previous embodiment, however, the cover 56 remains rigidly coupled to the scan head 14, and a sensor module 50 is inserted into the cover 56 through the opening 13.

More particularly, a slot is formed within the cover 56 which is defined by an upper surface 62 and a lower surface 66. A connector 67 is disposed at an end of the slot opposite from the opening 13, and provides electrical connection to the elements of the scanner 10' in the same manner as the connector 17 of the previous embodiment. A rectangular slit 64 is provided at opposite side surfaces of the cover 56, such that the slits extend parallel with the slot provided within the cover. The sensor module 50 is generally rectangular and is dimensioned to slidably engage the slot between the upper and lower surfaces 62, 66. The sensor module 50 further comprises a connector 52 provided at an end thereof in substantial alignment with the connector 67. A latching mechanism is provided on the sides of the sensor module 50, which includes a flexible arm member 54 with a catch 56 provided at an end thereof.

When the sensor module 50 is inserted into the slot, the catch 56 and flexible arm member 54 are deflected inward until the catch is coincident with the forward end of the slit 64, whereupon the catch snaps into the slit to secure the sensor module in place within the slot. The connectors 52, 67 become engaged to electrically connect the sensor module 50 with the scanner 10' upon the sensor module being fully inserted into the slot. To remove the sensor module 50 from the scanner 10', the catch 56 is pressed inwardly by an operator which causes the sensor module to become dislodged and eject outwardly from the slot.

By providing sensor modules with a standard size and electrical connection, the sensor module may be easily detached from the scanner 10 and replaced with another sensor module having different optical or performance characteristics. For example, a plurality of sensor modules could be provided that each have different focusing characteristics, or which use a one-dimensional CCD array rather than a two-dimensional array. Alternatively, the sensor module 20 could be provided with an entirely different type of optical sensor, such as one that utilizes an articulating laser. An operator can select a sensor module having characteristics that suit a particular purpose. As new scanning technologies are developed in the future, sensor modules can be manufactured using the new technologies to update existing scanners in the field. Lastly, the detachable sensor module permits an operator to replace a module that has become inoperable, allowing the scanner 10 to remain in use. It can be appreciated that the detachable sensor module of the present invention would substantially enhance the interoperability and flexibility of the scanner.

Having thus described a preferred embodiment of a generic handheld symbology scanner, it should be apparent to those skilled in the art that certain advantages of the described system have been achieved. It should also be appreciated that various modifications, adaptations, and alternative embodiments thereof may be made within the scope and spirit of the present invention. The invention is further defined by the following claims.

What is claimed is:

1. An apparatus for scanning a one or two-dimensional bar code symbol, comprising:

a scanner housing having a scan head, said scan head including a receptacle disposed therein;

a scanning control unit disposed within said housing separate from said receptacle and electrically connected to a first connector provided in said receptacle; and an optical module adapted to removeably engage said receptacle, said optical module comprising a second connector adapted to mate with said first connector upon engagement of said optical module with said receptacle, said optical module further comprising an optical sensor adapted to receive light reflected from said bar code symbol through an opening of said scan head and convert said light into data representative of said symbol, said data being thereby provided to said scanning control unit.

2. The apparatus of claim 1, wherein said optical sensor further comprises a one-dimensional charge-coupled device.

3. The apparatus of claim 1, wherein said optical sensor further comprises a two-dimensional charge-coupled device.

4. The apparatus of claim 1, wherein said optical sensor further comprises an articulated laser.

5. The apparatus of claim 1, wherein said optical module further comprises a light source adapted to illuminate said bar code symbol.

6. The apparatus of claim 1, wherein said scanner housing further comprises a hand gripping portion with a trigger for initiation of a desired scanning operation.

7. The apparatus of claim 1, wherein said scan head further comprises a hingedly attached cover, said receptacle being accessible for removal or engagement of said optical module upon selective movement of said cover to an open position.

8. The apparatus of claim 1, wherein said receptacle further comprises an internal slot of said scan head extending from said opening, said optical module being adapted to slidably engage said slot.

9. The apparatus of claim 8, wherein said optical module further comprises a locking mechanism adapted to secure said optical module within said internal slot upon slidable engagement of said optical module to a maximum extent therein.

10. An apparatus for scanning a one or two-dimensional bar code symbol, comprising:

a scanner housing having an internal receptacle;

a scanning control unit disposed within said housing separate from said receptacle and electrically connected with a connector provided in said receptacle; and optical means partially enclosed within said housing and removably engageable with said receptacle and said connector, for receiving light reflected from said bar code symbol and converting said light into data representative of said symbol, said data being thereby provided to said scanning control unit.

11. The apparatus of claim 10, wherein said optical means further comprises a one-dimensional charge-coupled device.

12. The apparatus of claim 10, wherein said optical means further comprises a two-dimensional charge-coupled device.

13. The apparatus of claim 10, wherein said optical means further comprises an articulated laser.

14. The apparatus of claim 10, wherein said optical means further comprises a light source adapted to illuminate said bar code symbol.

15. An apparatus for scanning a one or two-dimensional bar code symbol, comprising:

a scanner housing having an internal receptacle;

a scanning control unit disposed within said housing separate from said receptacle and electrically connected with a connector provided in said receptacle; and optical means, removably engageable with said receptacle and said connector, for receiving light reflected from said bar code symbol and converting said light into data representative of said symbol, said data being thereby provided to said scanning control unit, wherein said scanner housing further comprises a hingedly attached cover, said receptacle being accessible for removal or engagement of said optical means upon selective movement of said cover to an open position.

16. An apparatus for scanning a one or two-dimensional bar code symbol, comprising:

a scanner housing having an internal receptacle;

a scanning control unit disposed within said housing separate from said receptacle and electrically connected with a connector provided in said receptacle; and optical means, removably engageable with said receptacle and said connector, for receiving light reflected from said bar code symbol and converting said light into data representative of said symbol, said data being thereby provided to said scanning control unit, wherein said receptacle further comprises an internal slot extending from an opening in said scanner housing, said optical means being adapted to slidably engage said slot.

17. The apparatus of claim 16, wherein said optical means further comprises means for locking said optical means within said internal slot upon slidable engagement of said optical means to a maximum extent therein.

18. The apparatus of claim 10, wherein said housing further comprises means for removably locking said optical means to said housing.

* * * * *